Aug. 19, 1930.   F. C. SHEARER   1,773,707
ADVERTISING DISPLAY MECHANISM
Filed Dec. 9, 1927   3 Sheets-Sheet 1
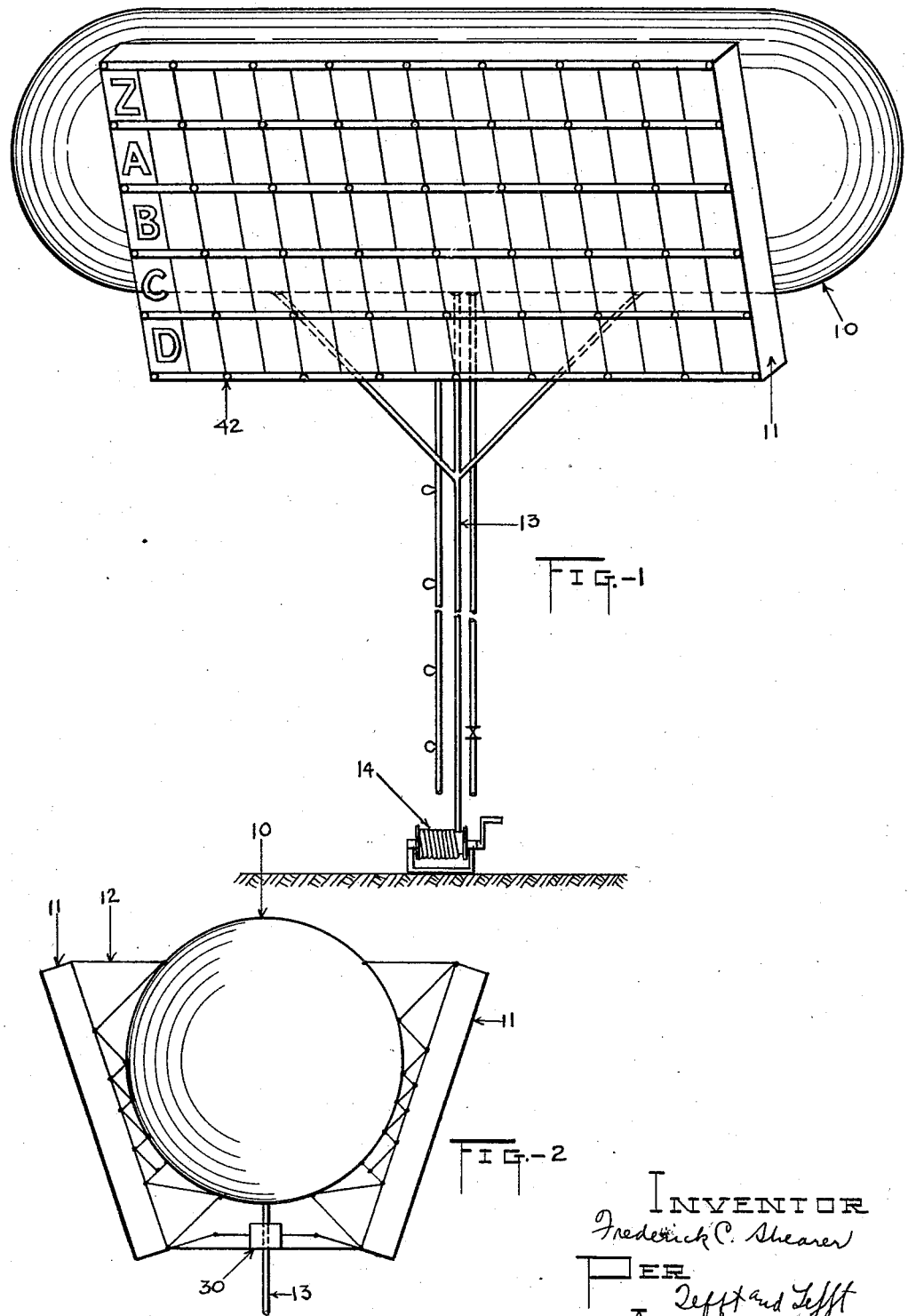

Aug. 19, 1930.   F. C. SHEARER   1,773,707
ADVERTISING DISPLAY MECHANISM
Filed Dec. 9, 1927   3 Sheets-Sheet 2
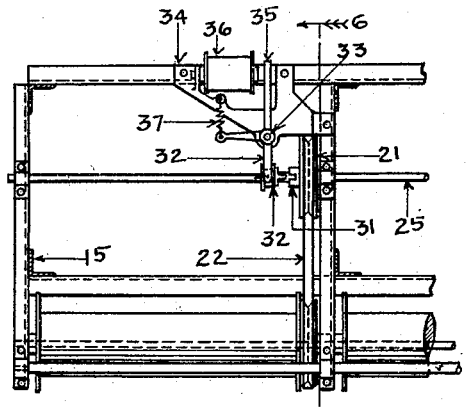
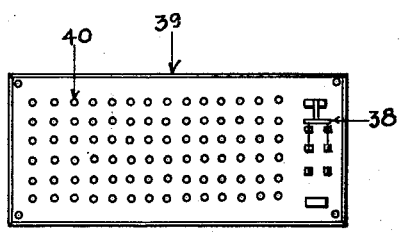
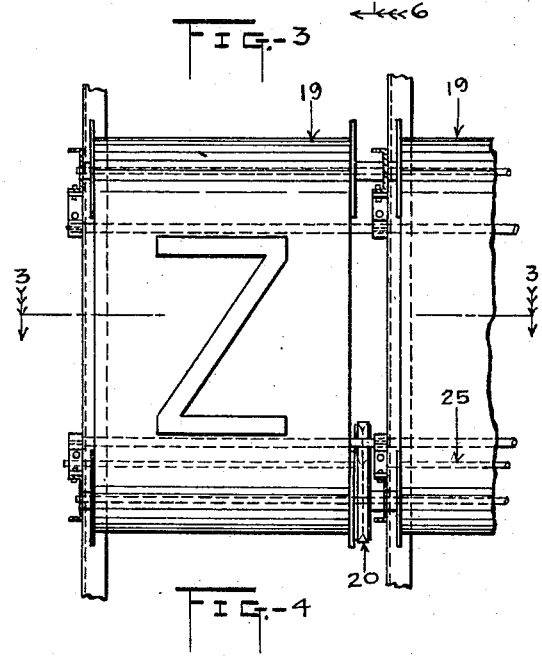
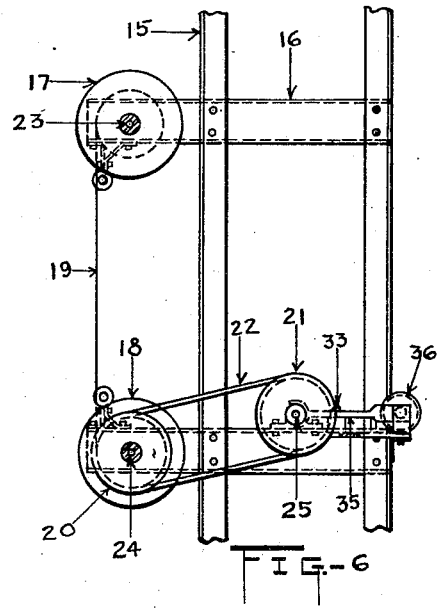
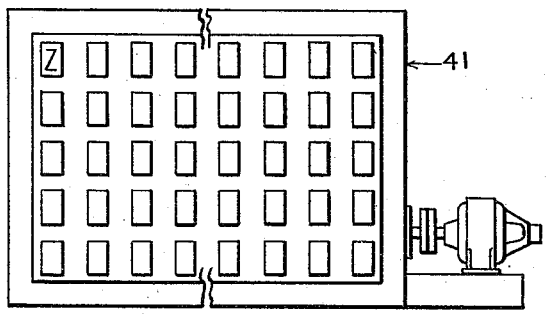

Aug. 19, 1930.  F. C. SHEARER  1,773,707
ADVERTISING DISPLAY MECHANISM
Filed Dec. 9, 1927  3 Sheets-Sheet 3
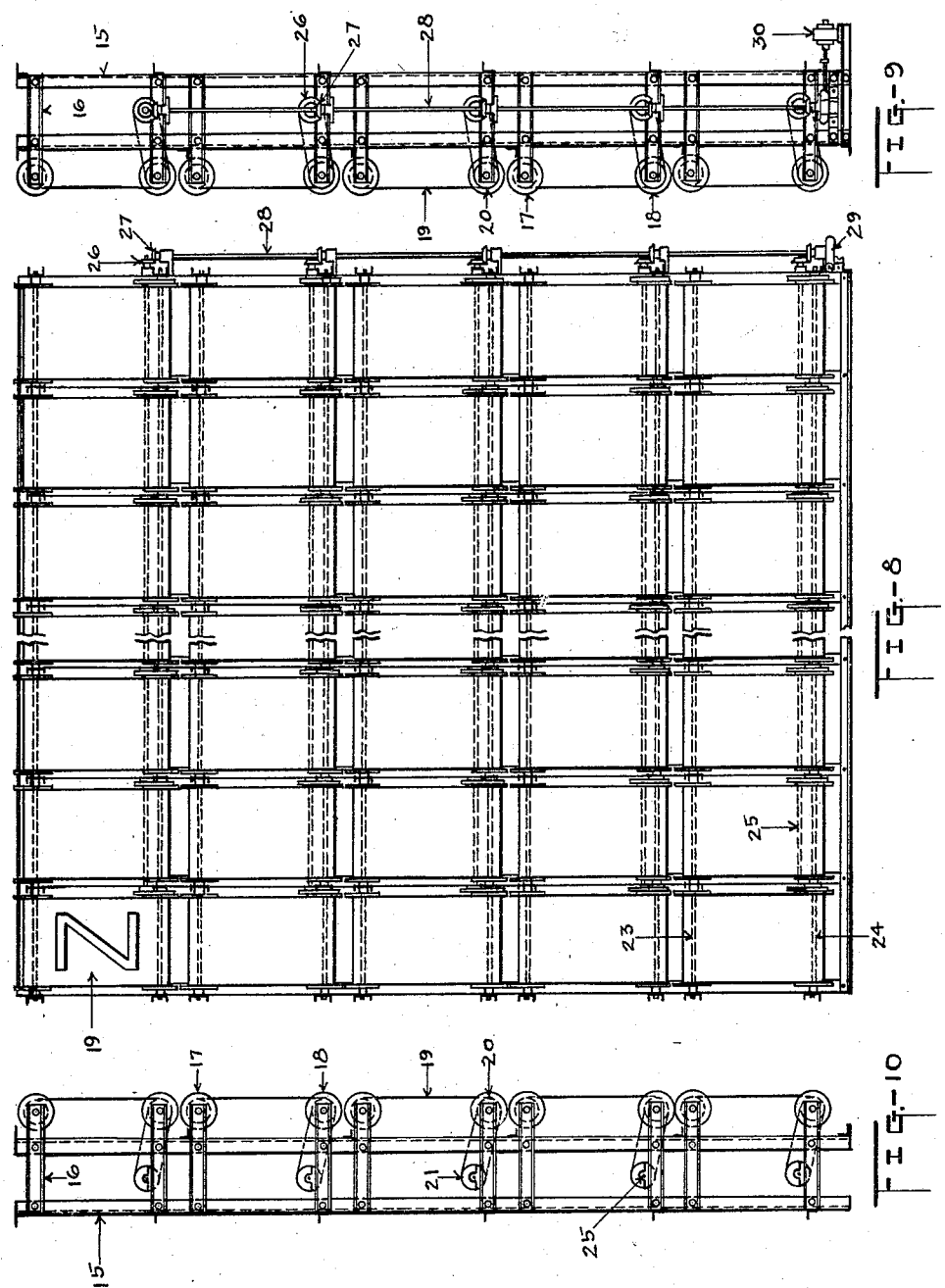

Patented Aug. 19, 1930

1,773,707

UNITED STATES PATENT OFFICE

FREDERICK C. SHEARER, OF PEORIA, ILLINOIS, ASSIGNOR OF ONE-THIRD TO C. A. SWANAGAN, OF TERRE HAUTE, INDIANA, AND ONE-THIRD TO DON L. BEEZLEY, OF PEORIA, ILLINOIS

ADVERTISING DISPLAY MECHANISM

Application filed December 9, 1927. Serial No. 238,825.

This invention relates to advertising display mechanism.

One of the objects of the invention is in the provision of an advertising display mechanism which can be elevated by means of a balloon or the like, to a position where it may be readily seen by spectators, there being operatively connected with said advertising display mechanism, means controlled by an operator upon the ground, for optionally changing the display mechanism appearing on the elevated advertising board or member.

Another object is in the provision of an advertising board which may be elevated either by a lighter than air member, or placed in an elevated or other suitable position, said board containing mechanism controlled from the ground, which permits optionally changing the advertising media displayed thereon in other than a predetermined or automatic manner.

Still another object lies in the provision of an advertising board which permits the display or writing thereon of advertising media by an operator located at a distant point, said advertising matter being entirely within the discretion of the operator.

A further object lies in the provision of an elevated advertising board adapted to be controlled by an operator who hasn't the board before him, said advertising board being motor driven and in such manner as to permit the operator to use his own option in the writing of his advertising matter.

A still further object lies in the provision of an advertising board having a plurality of movable portions thereon, said movable portions including the various letters of the alphabet and electrically operated means for controlling the lettered portions in a manner to permit the operator, located at a distant point, to write any advertising matter that he may desire upon said board.

Other objects will appear in the following specification taken in connection with the annexed drawings, in which—

Fig. 1 is a perspective view of applicant's board, the same being elevated by a balloon;

Fig. 2 is an end elevation of Fig. 1;

Fig. 3 is an enlarged elevation of the clutch mechanism controlling the letter rolls;

Fig. 4 is a front elevation of the alphabet or letter rolls;

Fig. 5 is a plan view of the operator's control board;

Fig. 6 is an end elevation of Fig. 4;

Fig. 7 is a general view of the synchronized alphabet board for use by the operator;

Fig. 8 is a front elevational view of the advertising board;

Fig. 9 is one end elevation of Fig. 8;

Fig. 10 is an opposite end elevation of Fig. 8.

Before referring to the drawings, it may be stated that applicant is aware of the fact that advertising boards have been elevated by balloons, and as a matter of fact, that the advertising media disclosed thereon has been capable of being changed by an operator located on the ground; however, this change of advertising media being accomplished in a prearranged or automatic manner, not within the control or discretion of the operator.

Applicant's present advertising display board has two main features, one being that of elevating the advertising board by a lighter than air member such as a balloon or the like, and the other being the control by the operator located at a distant point not within view of the board, who can use his own discretion in the matter of disclosure of advertising upon the board, which in this case may be in an elevated or at least some suitable location for the public to view.

Applicant has shown herein one manner of accomplishing the result of optionally changing the lettering upon the advertising board, it being apparent, however, that the actual mechanism for achieving this desired end might well be changed either as to simplicity of mechanical construction, cheapness, and possibly increased efficiency in obtaining an exactly similar result. Applicant, however, shows one means for accomplishing the control of the alphabet rolls upon the advertising board by an operator located at a distant point.

Referring to the drawings, a lighter than air member is shown at 10, the same being adapted to support advertising display boards generally referred to as 11, on either side thereof. These boards may be attached to the balloon 10 by means of a series of cables, ropes or the like, the same being generally designated 12. Means for raising and lowering the lighter than air member is provided in cable 13 and windlass 14. It might be stated at this time, however, that the advertising display boards 11 might in some instances be mounted upon the roofs of buildings located at suitable points or as a matter of fact in any manner which permits the public to perceive the various advertising matter adapted to be written thereon at the discretion of an operator located at a distant point. Although two boards have been shown in the present instance, the mechanism of only one board will be described, it being apparent that similar mechanism might well be used for each, and as a matter of fact, driven from one central point.

The boards 11 are made up of suitable rigid framing portions, the same including the vertical portions 15 and the cross pieces 16. Upon the projecting ends of the cross supporting pieces 16 are disposed roller members 17 and 18, carrying alphabet rolls 19. These rolls 19 include elongated strips or sheets, as may be clearly seen in various figures of the drawings, said strips carrying all the letters of the alphabets as well as punctuation marks and other necessary characters. These alphabet rolls 19 are so arranged that when moved in either one direction or the the other they will be rolled upon either roller 17 or 18. They are suitably attached to the rolls to prevent entire removal from either of the rollers. The lower roll 18 has a pulley 20 secured to the rods upon which the rolls are mounted, said pulley cooperating with a second pulley 21 disposed rearwardly thereof in a manner to be driven by a belt 22, which connects the two pulleys.

It will be noted that a description has been given of only one of the alphabet rolls, but inasmuch as it is apparent from the drawings that there is a mere duplication of the alphabet rolls, it is considered sufficient to describe only one alphabet roll.

Fig. 8 of the drawings perhaps discloses most clearly the manner of mounting these plural alphabet rolls, it being apparent that each one of such rolls 17 and 18 is carried upon horizontally disposed shafts 23 and 24, the same projecting through the outer ends of the cross pieces 16. The pulley 21 is carried by a horizontally disposed shaft 25, which in turn has a bevel gear 26 disposed upon its outer end. Means for driving this bevel gear 26 is provided in a second bevel gear 27, which is carried by a substantially vertically disposed drive shaft 28, in turn driven through a series of meshed gears, generally referred to as 29, by an electric motor 30.

Further, with respect to the manner of driving the horizontal shaft 25 carrying the pulley wheel 21, it might be stated that the advertising board is made up of a plurality of similar horizontally disposed shafts and gear driving mechanism. It is thought that a description of one of the driving means for the pulleys is sufficient for all.

It is now seen that the shaft 25 carrying the pulleys 21 is continuously rotated by an electric motor 30. Means for optionally clutching the pulley 21, which is normally not connected with the shaft 25, is provided in an electrically controlled clutch arrangement shown in Fig. 3. In this figure, the pulley wheel 21 is shown slidably connected with the horizontal drive shaft 25, and having upon one of its faces a female clutching portion 31. A male clutching portion is shown at 32, the same being slidable also upon the shaft 25. A bifurcated clutch control lever is shown at 32, pivoted at 33 on a bracket 34, secured to the framing portion. The outer end 35 of lever 32 is electrically controlled by a magnet 36, the latter being adapted, upon energization, to attract the end 35 of the clutch lever 32, and when attracted in this manner to accomplish the clutching of the male portion 32 with the female portion 31, and thus permit movement of the pulley 21, hence movement of the lower roll 18 through the belt 22, then the movement of the alphabet roll and therefore such rotation as will permit the presentation of the desired letter upon the board.

A coil spring 37 accomplishes the throwing out of the clutch upon de-energization of the magnet 36. It is thus found that there is an electrical control for the movement of the alphabet rolls. Applicant has not shown all of the electrical connections between the clutches for the alphabet rolls and the actual control board, which is shown in Fig. 5. This showing would require an exceedingly involved disclosure of electrical wires and circuits, which are in themselves very simple.

The motor 30 is a direct current motor controlled by a two-way switch 38. This direct current motor is of the type which may be run in either direction, being controlled by the two-way switch 38 and when thrown into one direction permitting rotation of the motor in one direction, and when thrown to the other position, accomplishing the movement of the motor in the reverse direction. It is apparent, also, that the throwing out of the switch also stops the motor. This control of a direct current motor is so well known as to obviate the necessity of showing in detail the structural features of the switch.

As respects the control board 39, which, we will say, is in front of the operator, who is located in a position where he cannot see the advertising board, there is shown a switch board, somewhat similar to that used in telephone offices, the same being of the so-called plug-in type. The operator, in order to energize one of the plural clutches, merely inserts the plug in one of the plural sockets 40. This plugging in accomplishes the energization of the clutch and consequently the movement of the alphabet roll, it being assumed that the motor is running and the shaft turning.

When the alphabet roll has been moved to the letter desired by the operator, he merely removes the plug and the roll remains stationary, with the proper letter exposed to view. Similarly, if the operator desires to change to another letter, he merely operates the two-way switch 38 to move the motor in the proper position to permit the appearance of the desired letter, therefore plugging in on the clutch to permit movement of the alphabet roll to disclose the desired letter.

It is thought that the description of the actuation of one of the alphabet rolls and the manner of controlling same is sufficient for all inasmuch as they are all controlled in the same manner.

The question may be readily raised as to how the operator, located at a point distant from the board, which we will assume is elevated, can stop the letters at the proper place on the alphabet roll, namely in a position where they can be viewed by the public. This is controlled by a synchronized control board 41, which is an exact duplicate of the elevated advertising board. Obviously, the synchronized control board 41 is made very much smaller and placed in a position adjacent the actual control board, that the operator may view same as he is plugging in on the control switches for the clutches of the plural alphabet rolls. Inasmuch as the synchronized control board 41 is an exact duplicate of that described, it is thought necessary merely to show the connection between the electric motor and the control board, it being stated that the movement of such board is synchronized with that of the large advertising board, and that the advertiser has same in such position that he may readily view it as he plugs in on the various clutches.

In Fig. 1, a plurality of electric lights 42 has been shown adapted to light the board, so that same may be readily seen at night. It is apparent that any manner of lighting the board might well be used other than the conventional electric lamp.

The operation of the advertising display board is thought to have been described somewhat in detail, but generally, it may be stated that the operator, located, we will say, in the room of some building, has before him the control board 39, as well as the synchronized board 41, the same upon energization moving in exactly the same manner as the larger board. The operator, in the first place, starts the electric motor, which rotates the plural drive shafts 25, the same being capable of moving the alphabet rolls when the proper clutches are energized. The operator then plugs in upon the alphabet roll that he first desires to use, and when the roll has been moved to such position that the proper letter appears, he immediately observes that it appears upon the synchronized board, and withdraws the plug, de-energizing the clutch controlling that particular alphabet roll, permitting said letter to remain stationary and in plan view upon the board. He then operates the motor to rotate the shaft in a direction desired as respects the next alphabet roll and thereafter plugs in on the clutch in a manner to cause the appearance of the proper numeral. When such character has appeared, he deenergizes the clutch and thereafter writes whatever advertising display matter he desires to appear upon the large board, the same being either lighted or not, as the case may be.

It is apparent from the above description that the operator may optionally, at any distance, accomplish the writing upon an advertising board of any matter that he desires. He may also readily change such advertising matter at any time, or in any manner that he so desires, this manner of advertising being distinctly different from that which has heretofore been used, and which has been either of a predetermined or an automatic nature.

What I claim is:

1. An advertising display device consisting of an advertising board, a control board, and remote control means for operating said advertising and control boards, said advertising and control boards being similar in construction, said boards each having two roller members, a belt and pulley connected to one of said roller members, an electric motor, means to drive the pulley by said motor, and a magnetically operated clutch, said motors being synchronized.

2. An advertising display device comprising an advertising board, a control board, and remote control means for operating said advertising and control boards, said advertising and control boards being similar in construction, each of said boards having an alphabet strip and an electric motor and means to move said strip by said motor, said motors being synchronized.

3. An advertising display device comprising an advertising board, a control board, and remote control means for operating said advertising and control boards, said advertising and control boards being similar in construction, each of said boards having an alphabet strip and an electric motor and a magnetically operated clutch between said strip and said motor, said motors being synchronized.

4. An advertising device comprising an advertising board, a control board, said advertising and control boards being similar in construction, each of said boards having a plurality of alphabet strips, an electric motor for driving said strips, a clutch between each of said strips and the motor, and means for operating corresponding clutches on the two boards simultaneously, said motors being synchronized.

In testimony whereof, I have hereunto affixed my signature.

FREDERICK C. SHEARER.